United States Patent [19]
Anderka et al.

[11] Patent Number: 4,459,602
[45] Date of Patent: Jul. 10, 1984

[54] AUTOMATIC DRAFTING APPARATUS

[75] Inventors: Gerold Anderka, Ellerbek; Gerhard Deblitz, Quickborn, both of Fed. Rep. of Germany

[73] Assignee: Koh-I-Noor Rapidograph, Inc., Bloomsbury, N.J.

[21] Appl. No.: 470,793

[22] Filed: Feb. 28, 1983

[30] Foreign Application Priority Data

Mar. 12, 1982 [DE] Fed. Rep. of Germany ....... 3208947
Mar. 12, 1982 [DE] Fed. Rep. of Germany ....... 8306915

[51] Int. Cl.[3] .............................................. G01D 15/16
[52] U.S. Cl. ................................ 346/140 R; 33/18 R; 346/141
[58] Field of Search ........... 33/18 R; 346/141, 139 C, 346/140 R

[56] References Cited

U.S. PATENT DOCUMENTS 1,157,552 6/1979 Nakajima .
3,613,248 8/1969 McInnis .
3,686,681 8/1972 Stegenga .
4,097,874 6/1978 Anderka et al. ................ 346/140 R
4,121,224 10/1978 Takeuchi et al. .
4,135,245 1/1979 Kemplin et al. .
4,173,020 10/1979 Anderka et al. ................ 346/140 R
4,173,021 10/1979 Zuchner et al. ................ 346/140 R

FOREIGN PATENT DOCUMENTS 2821612 5/1978 Fed. Rep. of Germany .
ND 6618160 6/1968 Netherlands .

*Primary Examiner*—Harry N. Haroian
*Attorney, Agent, or Firm*—David H. Semmes; Warren E. Olsen

[57] ABSTRACT

In an automatic drafting apparatus having at least one tubular writing pen (1) held in a drawing head (3), and movable between a rest position, in which the lower end of its tubular writing tip (2) is sealed by a laterally movable sealing element (9), and into a raised intermediate position, in which the element (9) is moved laterally out of the way of the writing tip (2), enabling the writing pen (1) then vertically to be lowered into a drawing position. An improved actuation element (11) means is moved laterally back and forth to move both the tubular writing pen (1) and the sealing element (9). This actuation element further comprises a cam or guide contour surface (13, 14, 15, 16) to engage a pin guide operatively connected to the writing pen, thereby to effect vertical movement of the writing pen (1) and also an oblong lateral recess coupled with the sealing element (9) through a second pin (19), for the purpose of defining a selective lateral displacement of the sealing element.

5 Claims, 4 Drawing Figures

AUTOMATIC DRAFTING APPARATUS

FIELD OF THE INVENTION

The invention relates to an automatic drafting apparatus having at least one tubular writing pen held in a drawing head. The writing pen can be lowered out of a raised rest position in which the forward end of its tubular writing tip is located above the drawing surface, into a drawing position in which the forward end of its tubular writing tip is in contact with the drawing surface. The drawing apparatus further has at least one sealing element, which, in the rest position of the tubular writing pen, is in sealing contact with the forward end of the tubular writing tip. In the drawing position of the writing pen the sealing element is moved laterally, relative to the writing tip.

The sealing element is part of a laterally moveable slide, which can be moved by a drive mechanism between a position for the sealing element when the writing pen is in the rest position and to a laterally displaced position of the sealing element. The tubular writing pen can be raised out of the rest position into an intermediate position, in which the forward end of its writing tip is located above the sealing element, and can be lowered out of the intermediate position into the drawing position when the sealing element is moved laterally out of the way.

BACKGROUND OF THE INVENTION

In a known drawing apparatus of this type (German published application, DE-OS Pat. No. 28 21 612), movement of a tubular writing pen between its various positions is effected by means of a linkage, comprising three different levers. One lever, at one end, engages the tubular writing pen and the other lever, at one end, engages the slide having the sealing element. The levers pivotably are supported and coupled with one another in such a manner that when the lever engaging the slide is moved by a drive mechanism, the various shifts in position are effected. For instance, the tubular writing pen is raised out of its rest position into an intermediate position, then the slide is shifted laterally and thus moves the sealing element out of range of the writing tip, and finally the tubular writing pen is lowered into its working position.

This known apparatus functions very reliably and satisfactorily in practice, but it has the disadvantage of having a relatively large number of individual parts, so that its manufacture and servicing become quite expensive.

OBJECT AND SUMMARY OF THE INVENTION

It is the object of the invention to create an automatic drafting or drawing apparatus of simple design, in which a tubular writing pen can be raised out of a sealed position of rest, the sealing element can be shifted laterally, and then the writing pen can be lowered onto the drawing pad.

In order to atain this object, a drawing apparatus of the general type described above is embodied in accordance with the invention in such a manner that the drive mechanism is connected with an actuation element which has a guide contour. In order to move the tubular writing pen between a rest position and a drawing position, this guide contour can be brought into engagement with the writing pen, or with a guide in the drawing head receiving the writing pen, and the actuation element is coupled with the slide.

Thus, instead of a linkage comprising a plurality of interconnected levers, only a single actuation element having a guide contour is used in the drawing apparatus according to the invention. The overall result is that a substantially simplified structure is attained, in comparison with drawing apparatus known earlier which required numerous individual parts.

In order to couple the single actuation element with the slide, the actuation element preferably has an oblong depression or recess, extending in the direction of the drive mechanism movement, into which a pin secured to the slide will protrude. The end of the depression or recess, which effects the lateral displacement movement of the slide into the position corresponding to the drawing position of the tubular writing pen, comes into engagement with the pin located on the slide after the section of the guide contour for generating and maintaining the intermediate position of the writing pen has come into engagement with the tubular writing pen or the guide. The end of the depression or recess which moves the slide back comes into engagement with the pin after the section of the guide contour for moving the tubular writing pen out of the drawing position, and into the intermediate position, has at least partially come into engagement with the tubular writing pen or the guide.

Further features and embodiments of the invention will become apparent from considering the following description and claims.

The invention now will be described in terms of a preferred embodiment, which is shown in a schematic and highly simplified form in the drawings.

DESCRIPTION OF THE PREFERRED EMBODIMENT

In the illustrated exemplary embodiment, a tubular writing pen 1 has a tubular writing tip 2 and a cylindrical, guiding section 4 schematically shown as held in a drawing head 3.

Figure 1:
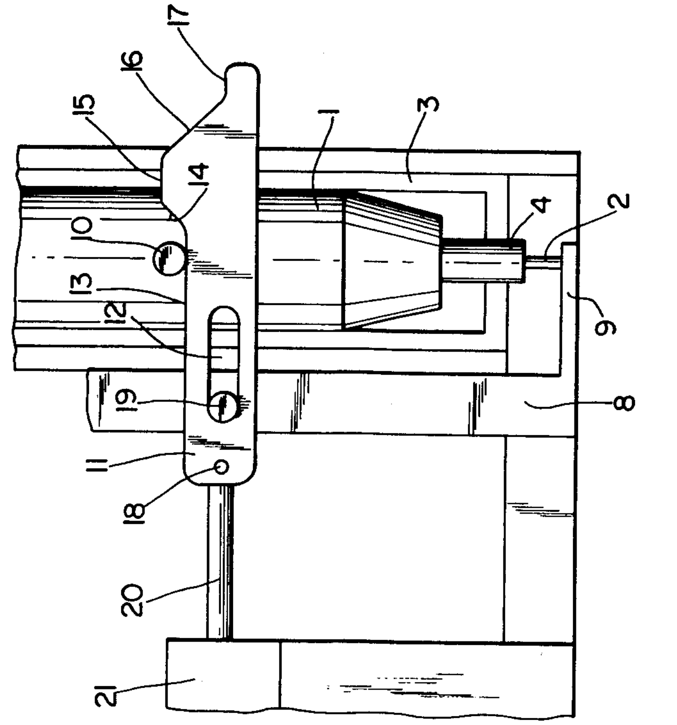
FIG. 1, in simplified form, shows part of a tubular writing pen, which is held in a drawing head, in its sealed, rest position.

In the rest position for the tubular writing pen shown in FIG. 1, the tubular writing tip 2 rests on a sealing element 9, which is made of elastic material, so that illustrated position will effect a sealing of the writing tip, thus preventing drying out of the ink. The sealing element 9 is part of a slide 8, and conventionally is held in place in a manner not shown.

A solenoid 21 having a push rod 20 is secured above the sealing element 9 and to the side of the tubular writing pen 1. The outer end of the push rod 20 is connected via a pin 18 with a plate-like actuation element means 11. This actuation element means extends laterally with respect to the drawing head 3, in such a manner that a radially extending pin 10, secured to the writing pen 1, will rest upon a guide contour of the actuation element 11. The outer end area of the actuation element protrudes through the drawing head 3 within an axially extending slit (not shown). The guide contour is embodied by a horizontal section 13; an obliquely rising section 14 which proceeds from section 13; a horizontal section 15 adjoining the upper end of section 14; a section 16 adjoining section 15 and extending obliquely downward; and a lower horizontal section 17 adjoining the lower end of the section 16. In the view shown in FIG. 1, the pin 10 rests on the upper horizontal section 13, and in this position the forward end of the writing tip 2 is in a condition of sealing engagement, against the sealing element 9.

The actuation element means 11 futhermore has a slit 12 extending in the direction of the longitudinal extension of the push rod 20, and a tranverse pin 19 secured to the sealing element slide support member 8 protrudes into the slit 12. In the position shown in FIG. 1, the seal pin 19 is located against a first or left-hand end surface of the slit 12.

The sealing element 8 is guided horizontally by a guideway mechanism not shown, so that it can be moved back and forth in the axial direction of the push rod 20.

Figure 2:
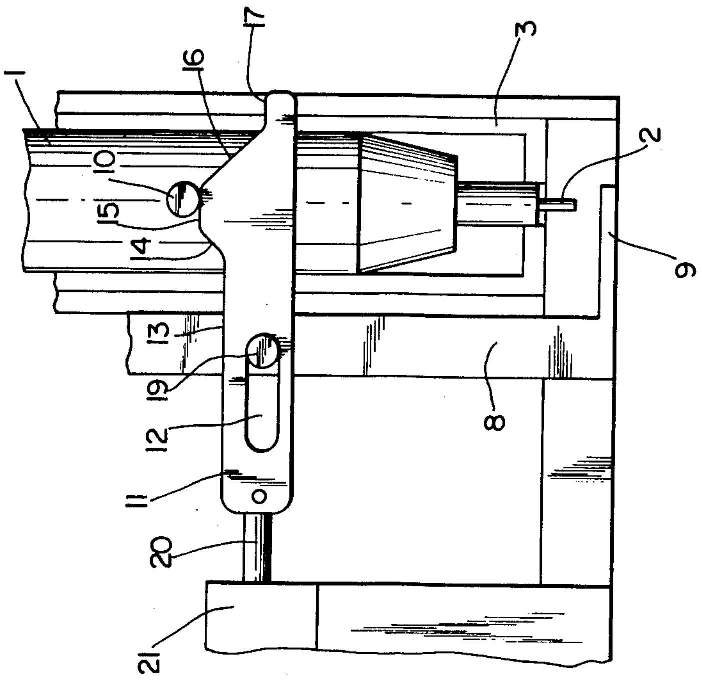
FIG. 2, is an illustration corresponding to FIG. 1, showing the tubular writing pen in a raised, intermediate position.
Figure 3:
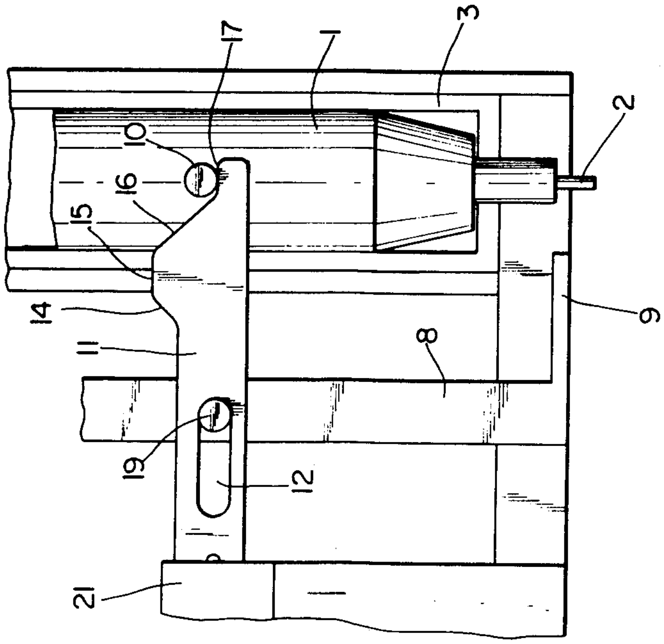
FIG. 3, is an illustration corresponding to FIGS. 1 and 2, showing the tubular writing pen in a drawing position.

As already mentioned, the sealing element 9 seals the forward end of the writing tip 2 in the position shown in FIG. 1, whenever the tubular writing pen accordingly is located in a rest position. If the writing pen 1 is to be moved into its drawing position, then a displacement of the push rod 20 toward the left is effected by the actuation of the lifting magnet or solenoid, 21. Consequently, the actuation element 11 then is moved toward the left as well, and the writing pen pin 10 slides over the section 14 of the guide contour as far as section 15. The result is that the writing pen moves out of the position shown in FIG. 1 and into the position shown in FIG. 2, in which the writing tip 2 has moved clear of the sealing element 9. In the course of this displacement of the actuation element 11 toward the left, the slit 12 has also moved with respect to the seal pin 19, so that the seal pin 19 now rests against a second or righthand end of the slit 12, as shown in FIG. 2. If the push rod 20 of the solenoid continues to move toward the left, then the seal pin 19, and thereby the slide support member 8 carrying the sealing element 9, are displaced toward the left, until the position shown in FIG. 3 is attained. During this second stage of displacement movement, the writing pen pin 10, and its connected writing pen 1, move downward from section 15 of the guide contour, along section 16, and towards section 17, thereby the writing pen 1 is lowered down to a drawing position.

Figure 4:
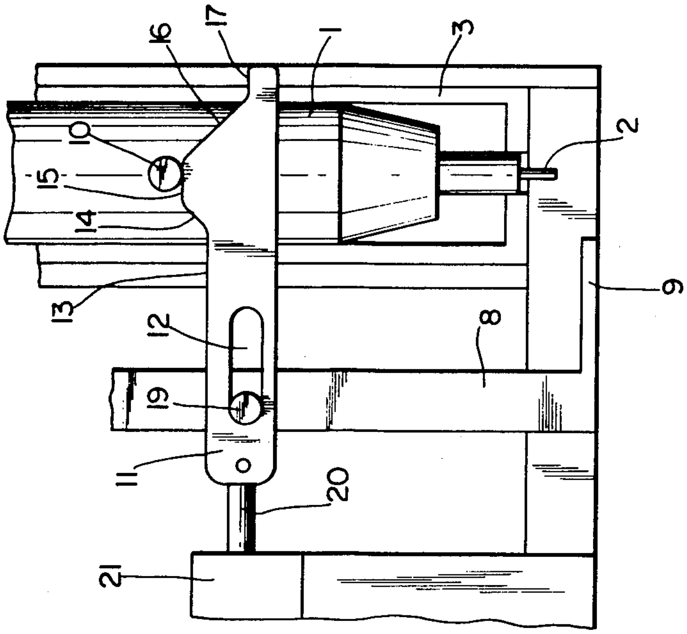
FIG. 4, is an illustration corresponding to FIGS. 1–3, showing the tubular writing pen in the intermediate position, into which it has been raised from the drawing position, and with the sealing element still shifted laterally with respect to the tubular writing tip.

In order temporarily to raise the tubular-tipped writing pen out of the FIG. 3 drawing position, for instance, in order to produce brief interruptions in the lines to be drawn, the actuation element 11 is moved back toward the right to a limited extent by means of the solenoid 21, so that the writing pen pin 10 travels upward from section 17 of the guide contour along section 16, and as far as horizontal contour section 15, if required (FIG. 4). During this process, there is no movement yet on the part of the sealing element; instead, a brief raising and lowering of the tubular writing tip, as often required during drawing operations, can be effected in a simple manner.

In order to move the tubular writing pen back into the rest position, the pen first is raised in the manner shown in FIG. 4, that is, into the intermediate position. In this position, the seal pin 19 again has reached the first or left-hand end of the slit 12, so that with any further movement of the push rod 20 toward the right, the sealing element 9 is moved back underneath the writing tip 2, as the writing pen pin 10 returns from section 15 of the guide contour to section 13 by way of the inclined section 14. Thereby, the rest position for the tubular-tipped writing pen as shown in FIG. 1, in which the tubular writing tip 2 is held in a sealed manner, is once again attained. Any guide, such as the writing pen pin 10, may be part of a pen support of the drawing head, or directly part of the pen body, itself.

While a preferred embodiment of our invention has been shown and described, it is to be understood that the invention is defined by the scope of the appended claims:

We claim:

1. An automatic drafting apparatus of the type comprising at least one tubular writing pen held in a drawing head and a drive means adapted to lower the pen out of a raised rest position, in which the forward end of its tubular writing tip is located above a drawing surface, and into a drawing position, in which the forward end of its tubular writing tip is in contact with a drawing surface, said apparatus further comprising at least one sealing element which, in the pen rest position, will be in sealing contact with the forward end of the tubular writing pen tip and, in the pen drawing position, said sealing element will be moved laterally with respect to the tubular writing pen tip by a laterally movable slide, which also is moved between a rest position and a laterally displaced position for the sealing element by said drive means, whereby the tubular writing pen is adapted to be raised out of a rest position and into an intermediate position wherein the forward end of its tubular writing tip will be located above the sealing element, and the tubular writing pen then can be lowered from said intermediate position into the said drawing position as the sealing element is moved laterally away, characterized by an improved lateral drive mechanism (20, 21) connected to an actuation element means (11) which comprises a guide contour (13, 14, 15, 16, 17), wherein movement of the tubular writing pen (1) between a rest position and a drawing position is through an engagement between the guide contour of the actuation element means and a guide element (10) operatively connected to the tubular writing pen (1) and said actuation element means (11) further comprising a coupling means to move said laterally movable slide (8).

2. A drafting apparatus as defined by claim 1, characterized in that the actuation element (11) coupling means comprises an oblong recess (12) extending in the direction of the movement of the lateral drive mechanism (20, 21), into which recess a pin secured on the slide (8) extends, wherein a first end of the recess (12) is adapted to effect a lateral displacement movement of the slide (8) from a first position to a second position which corresponds to the drawing position of the tubular writing pen (1) through engagement with a pin (19) located on the slide (8) after a section (14, 15) of the guide contour adapted to raise and maintain an intermediate position for the writing pen (1) has come into engagement with said writing pen guide element (10), and wherein the second end of the recess (12) is adapted to move the slide (8) back from said second position to said first position through an engagement with the pin (19) after the intermediate section (15, 16) of the guide has at least partially left engagement with a writing pen guide element (10).

3. A drafting apparatus as defined by either of claims 1 or 2, characterized in that the guide contour further comprises a first horizontal section (13) adjoining a short, obliquely rising section (14) and an adjoining second horizontal section (15), together adapted for raising the writing pen (1) from a rest position into said intermediate position as the actuation element is moved in a first direction, said guide contour further comprising a longer, obliquely falling section (16) adjoining said horizontal section (15) and followed by a third horizontal section (17), adapted for lowering the writing pen (1) in the drawing position.

4. A drafting apparatus as defined by either of claims 1 or 2, characterized in that the actuation element (11) means is movable laterally and at right angles with respect to a vertical movement direction of the writing pen (1), between its rest position and drawing positions.

5. A drafting apparatus as defined by either of the claims 1 or 2 characterized in that the drive mechanism further comprises a solenoid having a push rod (20) which is connected at its distal end to the actuation element means (11).

* * * * *